United States Patent [19]

Murvall

[11] 3,905,249

[45] Sept. 16, 1975

[54] CRANK HANDLES FOR FISHING REELS

[75] Inventor: Ake Eugen Murvall, Svangsta, Sweden

[73] Assignee: Abu Aktiebolag, Svangsta, Sweden

[22] Filed: May 6, 1974

[21] Appl. No.: 467,587

[30] Foreign Application Priority Data

May 11, 1973 Sweden .............................. 7306662

[52] U.S. Cl. ........................ 74/543; 16/110; 74/545
[51] Int. Cl.² ........................ G05G 1/10; G05G 1/12
[58] Field of Search ................ 74/545, 548; 16/110

[56] References Cited
UNITED STATES PATENTS

| | | | |
|---|---|---|---|
| 2,577,838 | 12/1951 | Baldwin, Jr. | 74/548 |
| 3,165,278 | 1/1965 | Wade | 74/545 X |
| 3,285,092 | 11/1966 | Sokol | 74/545 X |

Primary Examiner—Samuel Scott
Assistant Examiner—F. D. Shoemaker
Attorney, Agent, or Firm—Karl W. Flocks

[57] ABSTRACT

The present invention relates to a moulded crank handle including means comprising a hub for connecting the handle to the crank of a fishing reel, said handle being moulded of mouldable material into a shell-shaped structure having an open side and inner webs formed integrally with said shell structure and extending from a wall portion thereof opposite said open side of the shell structure and ending substantially flush with said open side for strengthening the shell structure and serving as a finger grip adapted to give a substantially dry-feeling support to the hand of the angler grasping said handle.

4 Claims, 4 Drawing Figures

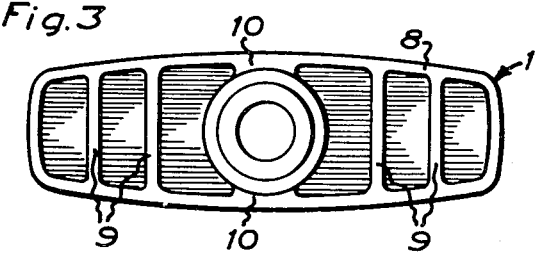
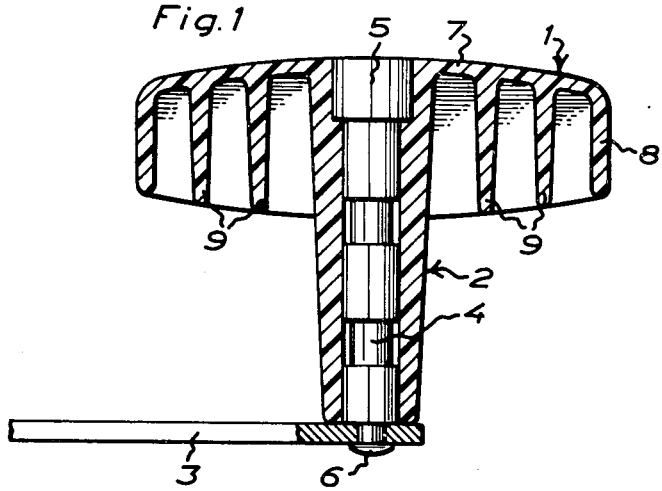
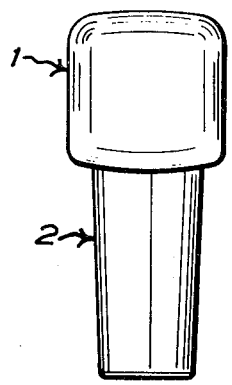
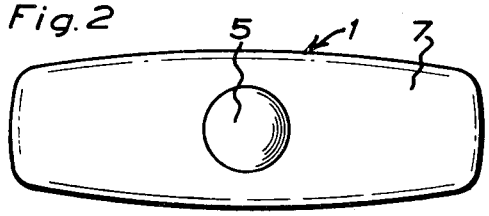

CRANK HANDLES FOR FISHING REELS

The present invention relates to a moulded crank handle including means for connecting the handle to the crank of a fishing reel.

When designing handles for fishing reels there are several partially contradictory aspects to take into consideration as is besides the case with all mobile details of fishing reels. The handle should be appropriate size and provide a perfect grip, which means that it should allow a firm hold and be comfortable to the hand, and it should be strong but also light for the handle increases the inertia of the entire crank mechanism. If the handle is too heavy the disengaged clutch mechanism risks being put into gear during casting. Add to this the manufacturing and economical points of view. Thin material in the crank handle means that only a small amount of material and generally a short moulding time are required and this is well compatible with the demand for a light handle but it must also be compatible with the demand for satisfactory strength. Preferably, it should also be possible to manufacture the handle with the simplest possible moulding tools since the handle is a detail that is to be manufactured on a large scale by moulding, and it should therefore be of such a shape that it is easily detached from the moulding tools without any requirement whatsoever of ejectors which in general involve disturbances and make the moulding equipment more expensive.

Accordingly, the design of the crank handle must be a compromise between hardly compatible demands.

This invention, however, has for its object to provide a crank handle which is both strong and light (requiring a comparatively small amount of material) and is of an advantageous design both with respect to the demand for perfect gripping and to the moulding technical points of view.

This object has been achieved with the handle of this invention, which comprises a continuous wall structure consisting of outer walls defining at least one cavity that is open at one side of the handle, and a plurality of inner walls bridging the cavity in its interior and dividing it into compartments for reinforcing the outer walls, the ends of said inner walls which are positioned at or near said side of the handle being adapted to provide support to the fingers of the hand.

Further features and advantages of this invention will appear from the following description.

The invention will be described in more detail hereinafter with reference to the accompanying drawing, in which:

FIG. 1 is a longitudinal sectional view of the crank handle of the invention;

FIGS. 2 and 3 are plan views of the handle of FIG. 1 as seen from above and from the bottom, respectively; and FIG. 4 is a side view of the handle.

The crank handle illustrated in the drawing comprises a handle portion 1 and a shaft portion 2 for mounting the crank handle in the indicated manner to the crank 3 (only a part of which is shown) of a fishing reel. The shaft portion 2 is in the form of a sleeve and is cast in one piece with the handle portion from a suitable plastic material, preferably acetal plastic. The sleeve-shaped shaft portion 2 is preferably of a markedly conical form tapering towards its outer end and includes a cylindrical axial bore for mounting on a pin 4 connected with the crank 3. According to the embodiment shown the bore in the shaft portion flares at the outer side of the handle to form a seat for a head 5 of the pin 4 which is joined to the crank 3 by means of a rivet 6.

A characteristic feature of the handle portion 1 is that it comprises a light, hollow shell structure cast in one piece with the outer end part of the central shaft portion 2, said shell structure consisting of a generally rectangular outer wall 7 and a continuous side wall 8 directed inwards from the circumference of the outer wall, which walls 7, 8 define a cavity opening inwards towards the crank and are reinforced by means of inner preferably parallel, lamellar walls 9 extending from the inside of the outer wall 7 and between the long sides of the side wall 8. The connection between the shell structure 7, 8 and the outer end part of the shaft portion 2 is reinforced by means of connecting bridges 10 on either side of the shaft portion. The inner reinforcement walls 9 and the bridges 10 divide the cavity of the shell structure 7, 8 into compartments which, in the example shown, are six in number since the handle has two inner reinforcement walls 9 on either side of the shaft portion 2 with its bridges 10.

Since the thickness of the side wall 8, the inner walls 9 and the shaft portion 2 with its connecting bridges 10 tapers in a direction away from the outer wall 7 towards the free ends of these walls, the cavity compartments in the handle portion 1 widen towards the open ends in the inwardly directed side of the handle portion to facilitate detachment from the form after moulding.

The outer contour of the handle portion 1 deviates from the geometrical form of a right-angled parallelepiped. In the embodiment shown the handle portion 1 tapers towards the ends. The lateral boundary surfaces (see FIGS. 2–4) are bow-shaped and the two boundary surfaces which are directed outwardly and inwardly, respectively, (the sides of the handle portion directed respectively outwards from and inwards towards the crank) are as well bow-shaped as arched (see FIGS. 1 and 4). The configuration shown in the drawing is suitable because it provides an excellent grip and simplifies the manufacture by casting. The invention is not confined to this outer configuration although it contributes to some degree to a strong and light construction and only requires a small consumption of material at the same time as it gives the other advantages mentioned above.

An essential advantage with the hollow structure and the lamellar wall lies not only in the strength and light weight but also in that the fingertips, which are the most sensitive parts of the hand and, when grasping the handle naturally, will touch the inwardly directed side of it, can find exactly the support that feels best at the moment either against the rounded outer edges of the lamellar walls or between these edges and that this support normally will be comparatively dry also if the rest of the handle is wet. As known, it is in the fingertips that the hand is most sensitive to moisture and the hand feels fairly dry if only the fingertips are dry. That side of the handle which is touched by the fingers will not feel slippery as is often the case with the crank handles of fishing reels, and, moreover, the fingers will not be troubled by sand and dirt on the handle to the extent as is usual in conventional handles. Thus, in several respects, the invention gives great unexpected advantages.

However, the invention is not confined to the embodiment shown. Thus, for instance, the most essential advantages of the invention can also be realized with a construction having open cavities at the outer side of the handle portion where this side, according to the embodiment shown, is covered by the wall 7. Such am embodiment appears to become still lighter than the embodiment shown but it requires heavier side walls or inner reinforcement walls. The shaft portion 2 or any equivalent means for connecting the handle with the crank can also in that case be joined with opposite sides of the annularly closed side wall 8 by connecting bridges 10 or also by being directly moulded into one piece with the crank.

What I claim and desire to secure by letters patent is:

1. A crank handle for a fishing reel and means for attaching the handle to a fishing reel crank, said attaching means comprising an axle, said crank handle comprising a hand grip member having an outer side and an inner side, and a tubular shank portion integral with said hand grip member for receiving said axle, said hand grip member comprising a wall member having an outer side which forms said outer side of the hand grip member and also having an inner side, said tubular shank portion being integral with said wall member and extending inwardly from the inner side thereof, a continuous flange integral with and extending inwardly from the periphery of said wall member to said inner side of said hand grip member substantially in parallel relation with said shank portion, said flange forming opposite side and end walls of said hand grip member, and, on either side of said shank portion, at least one transverse reinforcement partition integral with said wall member and said flange extending between said opposite side walls in spaced relation to said opposite end walls and to said shank portion from said inner side of said wall member to said inner side of said hand grip member, said flange and said at least one partition having free edges disposed at said inner side of said hand grip member forming finger supports for a hand grasping said crank handle for operating the fishing reel, and said wall member, said flange and said at least one partition defining a plurality of open cavities at said inner side of said hand grip member.

2. A crank handle as claimed in claim 1, wherein said handle is molded in one single piece with said flange and said at least one partition tapered in the direction from the inner side of said hand grip member to the inner side of said wall member to define tapered cavities which facilitate detachment from a mold after molding the handle in said continuous piece.

3. A crank handle as claimed in claim 1, wherein said shank portion extending from said inner side of said wall member projects out of said grip member at said inner side thereof, has an externally tapered form, and is connected with said opposite side walls by connecting bridges formed integrally with said side walls and said shank portion.

4. A crank handle as claimed in claim 1, wherein said wall member of said hand grip member has a substantially rectangular form.

* * * * *